US008369686B2

(12) United States Patent
Mei et al.

(10) Patent No.: US 8,369,686 B2
(45) Date of Patent: Feb. 5, 2013

(54) INTELLIGENT OVERLAY FOR VIDEO ADVERTISING

(75) Inventors: Tao Mei, Beijing (CN); Xian-Sheng Hua, Beijing (CN); Shipeng Li, Beijing (CN); Jinlian Guo, Hefei (CN)

(73) Assignee: Microsoft Corporation, Redmond, WA (US)

( * ) Notice: Subject to any disclaimer, the term of this patent is extended or adjusted under 35 U.S.C. 154(b) by 711 days.

(21) Appl. No.: 12/571,373

(22) Filed: Sep. 30, 2009

(65) Prior Publication Data

US 2011/0075992 A1    Mar. 31, 2011

(51) Int. Cl.
*H04N 9/80* (2006.01)
(52) U.S. Cl. ........................................ 386/249
(58) Field of Classification Search .............. 382/115; 386/248–249, 278, 283, 290; 705/14.41, 705/14.49–14.73; 715/723; 725/13, 32–38, 725/88
See application file for complete search history.

(56) References Cited

U.S. PATENT DOCUMENTS

| | | | |
|---|---|---|---|
| 7,643,657 B2 * | 1/2010 | Dufaux et al. ............... 382/115 |
| 8,059,936 B2 * | 11/2011 | Chen et al. ................. 386/248 |
| 2004/0189873 A1 | 9/2004 | Konig |
| 2005/0038814 A1 * | 2/2005 | Iyengar et al. ............ 707/104.1 |
| 2006/0026628 A1 * | 2/2006 | Wan et al. ................... 725/32 |
| 2006/0080167 A1 | 4/2006 | Chen |
| 2006/0294538 A1 | 12/2006 | Li |
| 2007/0204310 A1 * | 8/2007 | Hua et al. .................... 725/88 |
| 2007/0250901 A1 * | 10/2007 | McIntire et al. ............ 725/146 |
| 2008/0114861 A1 | 5/2008 | Gildred |
| 2008/0231751 A1 | 9/2008 | Zalewski |
| 2008/0276266 A1 * | 11/2008 | Huchital et al. ............. 725/32 |
| 2009/0018917 A1 | 1/2009 | Chapman |
| 2009/0030802 A1 * | 1/2009 | Plotnick et al. ............. 705/14 |
| 2009/0076882 A1 | 3/2009 | Mei |
| 2009/0079871 A1 | 3/2009 | Hua |
| 2010/0070523 A1 * | 3/2010 | Delgo et al. ................ 707/769 |
| 2010/0138852 A1 * | 6/2010 | Hirsch et al. ................ 725/13 |
| 2010/0199300 A1 * | 8/2010 | Meur et al. .................. 725/32 |
| 2011/0016487 A1 * | 1/2011 | Chalozin et al. ............. 725/35 |
| 2011/0072012 A1 * | 3/2011 | Ah-Pine et al. ............. 707/725 |
| 2011/0188836 A1 * | 8/2011 | Popkiewicz et al. ......... 386/278 |
| 2011/0217022 A1 * | 9/2011 | Miller et al. ................ 386/278 |

OTHER PUBLICATIONS

Mei et al. "VideoSense—Towards Effective Online Video Advertising", Proceedings of the 15th international conference on Multimedia, pp. 1075-1084, ACM New York, NY, 2007.*

(Continued)

*Primary Examiner* — Thai Tran
*Assistant Examiner* — Stephen Smith
(74) *Attorney, Agent, or Firm* — Lyon & Harr, LLP; Richard T. Lyon (57) ABSTRACT

Video advertising overlay technique embodiments are presented that generally detect a set of spatio-temporal nonintrusive positions within a series of consecutive video frames in shots of a digital video and then overlay contextually relevant ads on these positions. In one general embodiment, this is accomplished by decomposing the video into a series of shots, and then identifying a video advertisement for each of a selected set of the shots. The identified video advertisement is one that is determined to be the most relevant to the content of the shot. An overlay area is also identified in each of the shots, where the selected overlay area is the least intrusive among a plurality of prescribed areas to a viewer of the video. The video advertisements identified for the shots are then respectively scheduled to be overlaid in the identified overlay area of a shot, whenever the shot is played.

14 Claims, 5 Drawing Sheets

OTHER PUBLICATIONS

Chen, Feng. "Similarity Analysis of Video Sequences Using an Artificial Neural Network" thesis, University of Georgia, 2003.*
Hsu et al. "Reranking Methods for Visual Search" Multimedia, IEEE, Jul.-Sep. 2007, vol. 14, issue 3, pp. 14-22.*
Interactive Advertising Bureau, Digital video in-stream Ad format guidelines and best practices, Digital Video Committee, May 2008.
Liao, W.-S., K.-T. Chen, W. H. Hsu, AdImage: Video advertising by image matching and ad scheduling optimization. Proc. of the 31st Annual Int'l ACM SIGIR Conf. on Research and Development in Info. Retrieval, Jul. 2008, pp. 767-768, Singapore.
Liu, H., S. Jiang, Q. Huang, C. Xu, A generic virtual content insertion system based on visual attention analysis, Proc. of the 16th Int'l Conf. on Multimedia, Oct. 2008, pp. 379-388, Vancouver, British Columbia, Canada.
Mei, T., X.-S. Hua, L. Yang, S. Li, VideoSense: Towards effective online video advertising, Proc. of the 15th Int'l Conf. on Multimedia, Sep. 2007, pp. 1075-1084, Augsburg, Germany.
Microsoft Corp., Overlay video ad, retrieved Jul. 29, 2009 from http://advertising.microsoft.com/Advertise/CreativeSpec.aspx?CS_CreativeSpecID=56.

* cited by examiner

INTELLIGENT OVERLAY FOR VIDEO ADVERTISING

BACKGROUND

The quantity of videos on the Internet is increasing dramatically with the proliferation of digital capture devices and explosive growth of video-sharing sites. In addition, a fast and consistently growing online advertising market has been witnessed in recent years. Motivated by the huge business opportunities and the advantages of the video form of information representation, video advertising, which incorporates advertisements into an online video, has become popular. It is estimated that around 39% video streams contain video advertising.

SUMMARY

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

The video advertising overlay technique embodiments described herein generally detect a set of spatio-temporal nonintrusive positions within a series of consecutive video frames in shots of a digital video and then overlay contextually relevant ads on these positions. In one general embodiment, this is accomplished by first decomposing the video into a series of shots. Then, for each of a selected set of the shots, a video advertisement is identified from a set of video advertisements that is most relevant to the content of the shot under consideration. In addition, an overlay area is identified from a plurality of prescribed overlay areas in the shot under consideration. The overlay area identified is the one that when a video advertisement is overlaid thereon it is the least intrusive among the prescribed areas to a viewer of the video. Once an advertisement and an overlay area are identified for the shot under consideration, the video advertisement is scheduled to be overlaid onto the overlay area, whenever the shot is played. This is repeated for each of the selected set of shots so that a video advertisement is scheduled for each one.

DESCRIPTION OF THE DRAWINGS

The specific features, aspects, and advantages of the disclosure will become better understood with regard to the following description, appended claims, and accompanying drawings where:

DETAILED DESCRIPTION

In the following description of video advertising overlay technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Intelligent Overlaying of Video Advertising

Figure 1:
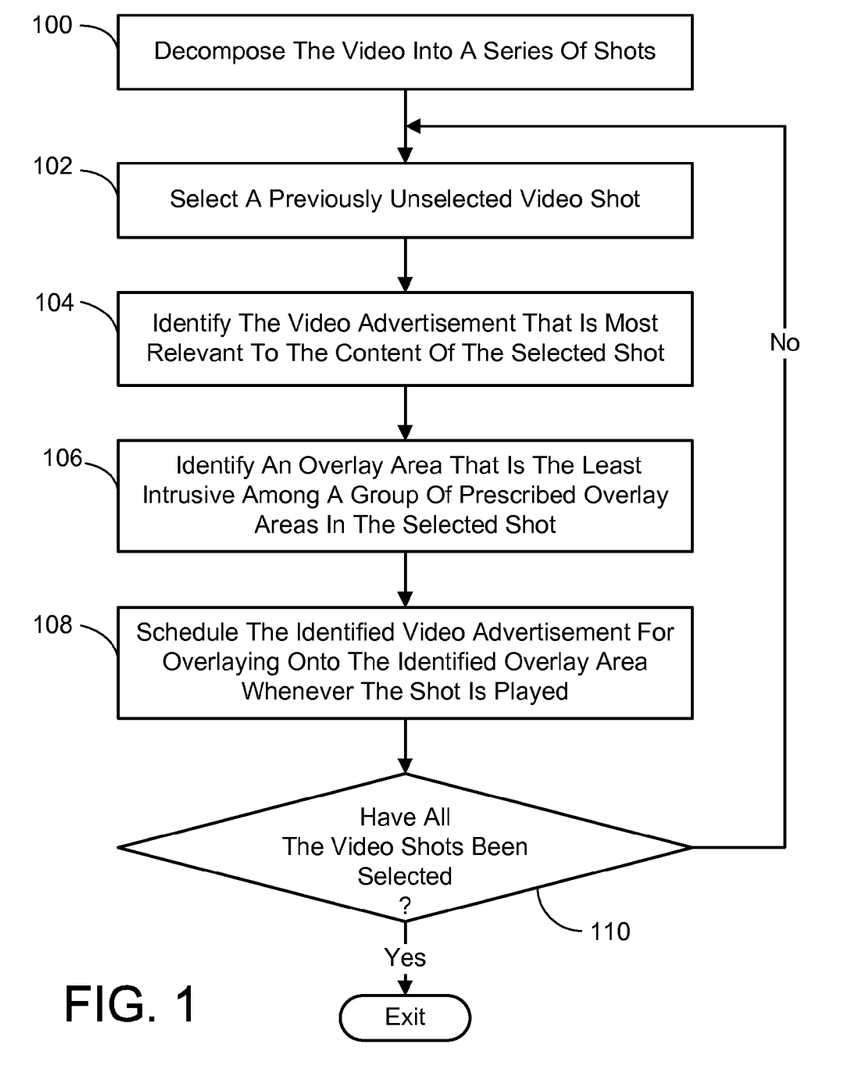
FIG. 1 is a flow diagram generally outlining one general embodiment of a process for overlaying video advertisements in a digital video.

The video advertising overlay technique embodiments described herein automatically detect a set of spatio-temporal nonintrusive positions within a series of consecutive video frames in shots of a video and then overlay contextually relevant ads on these positions. More particularly, referring to FIG. 1, the video advertising overlay technique embodiments described herein generally entail using a computer (such as any of the computing devices described in the computing environment section of this disclosure) to perform the following process actions. First, the video is decomposed into a series of shots (100). A previously unselected video shot is then selected (102), and a video advertisement that is most relevant to the content of the selected shot is identified from a set of video advertisements (104). Next, an overlay area that is the least intrusive among a group of prescribed overlay areas in the selected shot is identified (106). It is noted that the least intrusive overlay area is the area that is least intrusive to a viewer when a video advertisement is overlaid on that area. Once the most relevant video advertisement and least intrusive overlay area are identified for the selected shot, the identified video advertisement is scheduled for overlaying onto the identified overlay area whenever the shot is played (108). It is then determined if all the video shots it is desired to consider have been selected and processed (110). If not, then actions 102 through 110 are repeated. When all the desired shots have been considered, the process ends.

In various embodiments, the overlay positions are obtained using one or more techniques, such as (but not limited to) video structuring, face and text detection and visual saliency analysis. In this way, the intrusiveness to viewers can be minimized. For example, in some embodiments, the video advertisement insertion positions are automatically discovered based on video highlight and nonintrusive region analysis. This minimizes the intrusiveness of the ads, while maximizing the effectiveness of advertising. Furthermore, in some embodiments, the overlay advertisements appear in an interactive way. For example, the advertisements can be hidden or enlarged by users' input.

In general video overlay advertisements play across a series of consecutive frames of a shot of a video in the same area of the frames. The advertisements themselves can be static across the frames, or dynamic in that they change as the frames are played. The advertisements can include real or generated images, animations, text, and even audio. In addition, video advertisements can contain one or more of (but are not limited to) a product logo, name, description, and links to sites on the Internet or an intranet. These advertisements are selected based on their contextual relevance to the video content. In this way, the relevance of the overlay advertisements is maximized. The selection criteria can be multimodal as well. For example, the selection process can involve considering not only textual relevance but also visual similarity. Thus, in general the video advertising overlay technique embodiments described herein provide for the intelligent overlay of video advertising by leveraging video content analysis techniques.

1.1 Video Advertising Overlay Architecture

Figure 2:
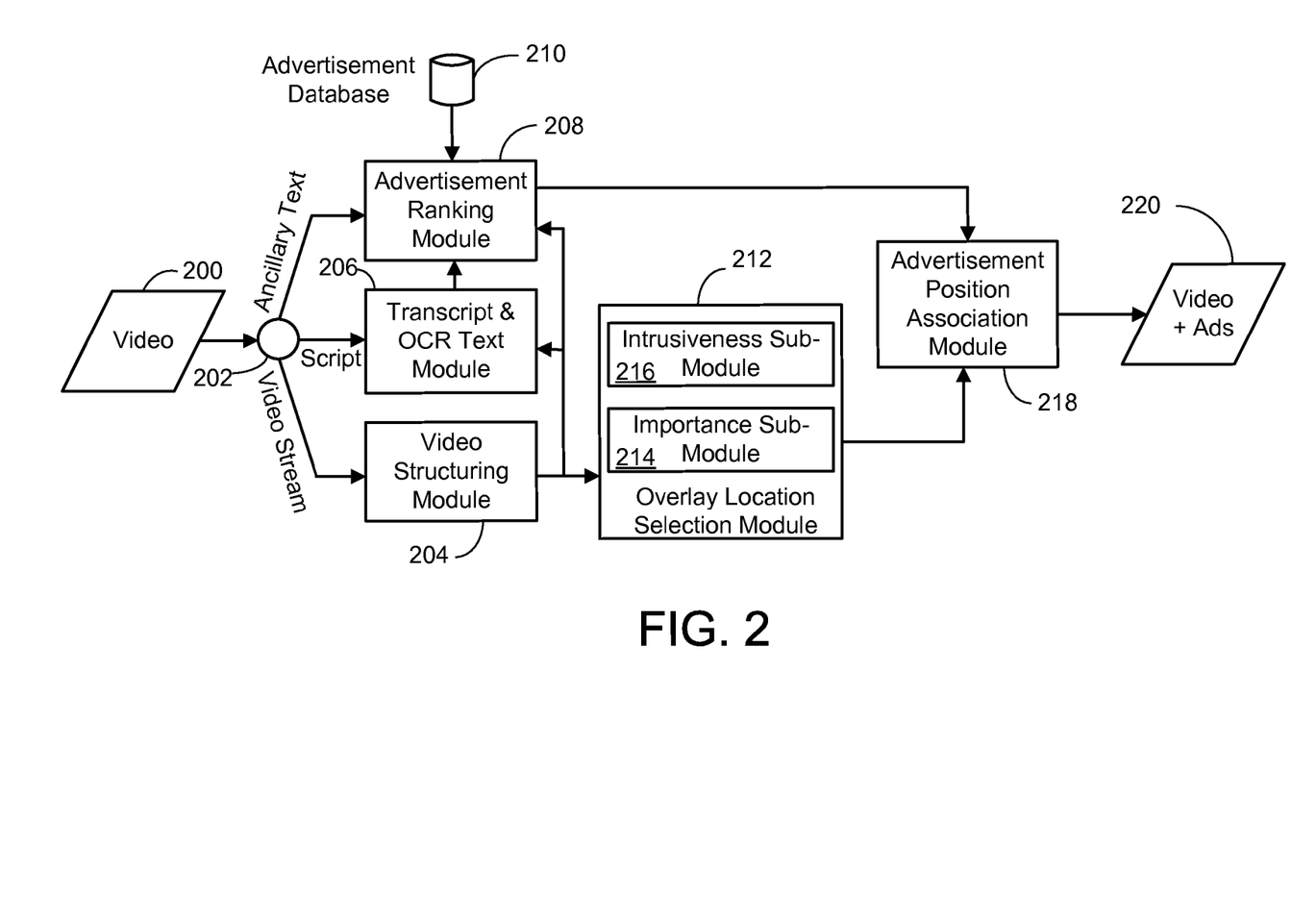
FIG. 2 is a simplified diagram of one embodiment of an architecture for implementing the video advertising overlay technique embodiments described herein.

FIG. 2 illustrates one embodiment of architecture for implementing the video advertising overlay technique embodiments described herein. It is noted that the embodiment shown in FIG. 2 includes many the features described previously. It is understood that one or more of the included features could be eliminated, or others added, in another implementation, without deviating from the general scope of the technique.

In FIG. 2, a digital video 200 is input to a splitter module 202 that separates it into a visual track, and at least one of an audio track and ancillary text. The visual track includes a video stream made up of consecutive video frames. The audio tract can be in the form of audio transcripts contained within the video, such as those used to provide closed captions. However, at least a part of the audio track can also be derived by the splitter module 202 from an audio stream included in the video. For example, if closed captions are not included in the video, a transcript can be obtained from the audio stream using conventional speech recognition methods. This can be accomplished by the splitter module 202, or in an alternate implementation, a transcript of the audio stream is generated before hand and included in the video 200. In this latter case, the splitter module 202 simply obtains the transcript from the video 200.

In addition to a derived transcript (if one), words and characters depicted in the video frames from the video stream can be recognized using conventional optical character recognition (OCR) methods, and included in the audio track. As will be described shortly, a series of keyframes are identified amongst the video frames. In one implementation, OCR is applied only the keyframes of the video stream to reduce processing costs. This will be described in more detail in conjunction with the description of the transcript and OCR text module 206.

As for the aforementioned ancillary text, this can include any metadata included with the video, such as its title, keywords associated with the video which describe its content, and other textual material. In general, the ancillary text and transcripts are used for selecting a list of relevant advertisements using text-based matching techniques, as will be described shortly.

The video stream is provided to a video structuring module 204, where it is first decomposed into a series of shots and a keyframe is selected from each shot. For the purposes of this description, a shot is defined as an uninterrupted temporal segment in a video sequence, recorded by a single camera, and a keyframe is defined as the representative frame which represents the main content of a segment (e.g., shot). Any appropriate method can be used to define the shots and identify the keyframes. The audio transcript (if one is available or generated by the splitter module 202) is provided to the aforementioned transcript and OCR text module 206. It is the transcript and OCR text module 206 that employs the previously mentioned OCR methods to recognize any words and characters depicted in the video frames (or just the keyframes) from the video stream. To this end, the video frames (or just the keyframes) are supplied to the transcript and OCR text module 206 from the video structuring module 204. Text from the transcript (if any) and any OCR recognized text is supplied to an advertisement ranking module 208 from the transcript and OCR text module 206, along with any ancillary text from the splitter module 202. It is noted that in an alternate embodiment of the architecture, the ancillary text could be transferred from the splitter module 202 to the transcript and OCR text module 206, and then provided by module 206 to the advertisement ranking module 208 along with the other aforementioned text. In addition, the shot designations established by the video structuring module 204, as well as the keyframes in some implementations, are provided to the advertisement ranking module 208. The advertisement ranking module 208 also has access to a video advertisement database 210. This database 210 is a repository of video advertisements that can be overlaid into the video. The database 210 also includes information about each of the advertisements. This information can include, but is not limited to, keywords that are descriptive of the advertisement's content, a textual description of the service or product being advertised, brand names, slogans and logos. It is noted that the information associated with the advertisements can be supplied by the advertiser, or in one implementation is extracted from the audio and visual of the advertisements themselves using methods similar to those described previously to obtain text from the original video 200.

The advertisement ranking module 208 employs the text derived from the original video 200, and the information associated with the advertisements to identify advertisements that are most contextually relevant to each shot of the video. As indicated previously, the advertisement selection process can involve considering not only textual relevance but also visual similarity. In embodiments employing visual similarity, the advertisement ranking module 208 also employs the keyframes supplied by the video structuring module 204 to identify advertisements that are most visually similar to each keyframe of each shot of the video. The advertisement ranking module 208 then combines the results of the text-based and visual similarity-based selections to establish the most overall relevant advertisement to each shot of the video.

While the foregoing advertisement selection process is being accomplished, another part of the architecture is selecting locations in shots of the video where the advertisements will be overlaid. In general, this set of overlay advertisement positions is determined based on shot content intrusiveness and optionally importance. Each overlay advertisement position is a spatio-temporal position in a shot with a predefined duration, e.g., 15 or 30 seconds. Intuitively, the overlay advertisements would appear at a nonintrusive (e.g., smooth) region in the video highlights (i.e., the most attractive shots). To accomplish this location selection, the video stream along with the shot and keyframe designations are provided to an overlay location selection module 212. In one embodiment, the overlay location selection module 212 employs an importance sub-module 214 to determine the relative importance of the shots. The shot importance can be gauged by the duration of the shot and its motion intensity. It is noted that fewer or additional shot importance measures can be employed and combined as desired without deviating from the intended scope to the selection process. Once a measure of the importance of each shot is computed, only those that have the higher values up to a prescribed number of shots are selected for video advertisement overlay. The prescribed number of shots can be made to correspond to the number of advertisements that are to be overlaid in the video. The overlay location selection module 212 then employs an intrusiveness sub-module 216 to determine the intrusiveness of overlaying an advertisement onto candidate locations in a shot. In one embodiment, the intrusiveness is based on a combination of face, caption, and image saliency maps. However, it is not intended to limit the selection of an overlay position in a shot to just the aforementioned combination. Fewer or additional detection methods can be employed and combined as desired without deviating from the intended scope to the selection process. It is noted that when the importance of the shots is computed and used to identify a set of important shots, only these important shots are subjected to the intrusiveness analysis.

A list of advertisements determined to be most relevant to the shots of the video, as well as the selected advertisements themselves, are provided from the advertisement ranking module 208 to an advertisement position association module 218. In addition, a list of the shots and the location in these shots where a video advertisement is to be overlaid is provided from the overlay location selection module 212 to the advertisement position association module 218. The advertisement position association module 218 uses these inputs to associate the appropriate advertisement to the selected location in the selected shots of the video. The modified video 220, now with the selected advertisements and the aforementioned associations is then output from the association module 218. When the video is played, the selected advertisements are overlaid onto the selected locations in the selected shots using conventional methods.

1.2 Video Advertising Overlay Processes

Processes for implementing the video advertising overlay technique embodiments described herein which were referred to in the foregoing architecture description will now be described in more detail in the sections to follow.

1.2.1 Video Advertisement Ranking

In video advertising, embedded advertisements are more effective if they are relevant to video content. As eluded to previously, one way of determining if an advertisement is relevant to a video is to employ the aforementioned text derived from the original video, and the information associated with the advertisements, to identify advertisements that are most contextually relevant to each shot of the video. While any appropriate textual matching method can be employed, in one embodiment, the cosine distance in a Vector Space Model (VSM) is adopted as the basis of textual relevance between the texts associated with the video and advertisements.

Also as indicated previously, the advertisement selection process can involve considering visual similarity. In embodiments employing visual similarity, keyframes for each shot can be used to identify the advertisement that is most visually similar. This is accomplished using any appropriate visual similarity determination method. For example, but without limitation, the bag of visual words technique or the local features technique can be employed for this purpose.

When both the results of a text-based and a visual similarity-based advertisement selection process are used to establish the most overall relevant advertisement to shots of the video, any appropriate rank combination technique can be employed. For example, but without limitation, a weighted linear combination technique can be used. In one embodiment, this involves assigning a higher weight (e.g., 0.8) to the video similarity ranking between an advertisement and a shot of the video, and the lesser weight (e.g., 0.2) to the textual ranking between the advertisement and the shot. The weighted results are then added to produce an overall measure of the relevance for the advertisement and the shot involved. This is repeated between each shot being considered and each advertisement being considered until a combined rank has been established for each pairing. The highest ranking advertisement for each shot is then determined and designated as the most relevant advertisement for that shot.

1.2.2 Overlay Advertisement Position Determination

Generally, the embedded advertisements should appear in the most attractive shots but at the same time should not occlude important information in the corresponding video frames of a shot. To this end, a two step process is employed where based on a given number of video advertisements that are to be overlaid in the video, it is first determined which shots will get overlaid advertisements, and then an unobtrusive overlay location is determined in each of the selected shots. The determination of which shots will get overlaid video advertisements can be based on the importance of the shots. If so, only the most important shots up to the number of advertisements to be overlaid would be selected.

Intuitively, a long duration and intensive motion usually indicates something important is happening in a shot. Thus, suppose there are $N_s$ shots in a video. The content importance $I_m(s_i)$ indicates the "attractiveness" of the content in shot $s_i$ (where i ranges from 1 to $N_s$), which in one embodiment is measured by the shot duration $D(s_i)$ and motion intensity $I(s_i)$, i.e., $I_m(s_i)=D(s_i) \cdot I(s_i)$. In regard to computing the motion intensity $I(s_i)$ of a shot, this can be accomplished using any appropriate method. For example, in one simple embodiment, the difference in intensity between each consecutive frame in the shot is computed. These differences are then averaged to produce a measure of the motion intensity for the shot. Now suppose there are to be $N_A$ video advertisements to overlay in the video. In this example, the $N_A$ number of video shots having the highest interest scores $I_m(s_i)$ would be chosen for having advertisements overlaid at a location yet to be determined. In regard to the number $N_A$ of video advertisements that are to be overlaid in the video, this value can come from a variety of sources. In one embodiment, the number $N_A$ is provided as a user input. In other words, the person generating the video with embedded overlay advertisements inputs the number of advertisement to be embedded. In another embodiment, the number $N_A$ of advertisements that will be embedded is determined automatically based on the duration of the video and a prescribed limit. For example, in one embodiment, a limit of one video overlay advertisement per 10 minutes of video is used. Thus, a 60 minute video would have no more than 6 overlay advertisements.

It is noted that in the previously described embodiments where visual similarity is employed as a factor in determining the most relevant advertisements for each shot, it is possible that relevant advertisements might be identified for shots that will not be slated for an overlay advertisement. In an alternate embodiment, the efficiency of the foregoing process is increased by first determining which shots will have overlaid advertisements, and then identifying the most relevant advertisements only for those shots. More particularly, once the most important shots are determined, the visual similarity process is performed using just the keyframes of the selected shots. In addition, only the rankings (textual and visual similarity based) associated with the selected shots are combined to produce an overall ranking for these shots.

The efficiency of the process can also be increased if the visual similarity analysis is performed for less than all the advertisements that are available for overlaying. To this end, in an alternate embodiment, the results of the previously described text-based procedure for identifying advertisements that are most contextually relevant to each shot of the video are used to identify a set of candidate advertisements. Only the candidate advertisements would undergo the visual similarity process. In one implementation, the set of candidate video advertisements would be those whose text-based relevance measure (computed as described previously) exceeded a prescribed threshold In addition, once the most important shots are determined, a content intrusiveness value $I_n(s_i)$ is computed for the selected shots. This intrusiveness value $I_n(s_i)$ measures the degree to which overlaying a video advertisement in a prescribed area of the video frames of a shot would be intrusive to viewers. There can be two or more prescribed areas that are tested for intrusiveness, and the least intrusive is selected for a video overlay advertisement. While any areas in the frames of a shot can be prescribed for intrusiveness testing, certain areas will typically tend to be less active and so more likely not to be intrusive to the viewer. For example, in one embodiment the areas corresponding to the upper and lower one-fifth of the frames are designated as prescribed test areas. In another embodiment, the areas corresponding to the leftmost and rightmost one-fifth of the frames are designated as prescribed test areas. And in yet another embodiment all four of the foregoing areas are designated as prescribed test areas.

In one implementation, the content intrusiveness value $I_n(s_i)$ is computed as follows. For a shot $s_i$, neighboring frames preceding and after its keyframe $k_i$ are identified such that collectively they would take a prescribed period of time to view at an intended frame rate. While any time period up to the full duration of the shot can be chosen to test, in one implementation the time period matches the length of the advertisement chosen for the shot. It is also noted that depending on where in the shot the keyframe appears, it may not be possible to identify an even number of preceding and succeeding neighboring frames. In such a case, all neighboring frames on the shorter duration side of the keyframe would be identified and as many frames on the longer duration side of the keyframe as is needed to reach the prescribed time period would be identified.

Once the neighboring frames have been identified, several maps are calculated for each frame j of the shot under consideration (where j is member of the set of identified neighboring frames and the keyframe). These maps include a text map $M_T(j)$, a face map $M_F(j)$, and an image saliency map $M_S(j)$. An intrusiveness map $M(j)$ is then computed by combining the three maps. In general, the higher intensity a pixel has in $M(j)$, the more intrusive it would be a viewer if an advertisement is overlaid onto that pixel. Each pixel of the text map $M_T(j)$ of an area simply identifies if that pixel displays a part of a textual element in the frame (j) associated with the map. For example, in one implementation, if the pixel is a text pixel, then a "0" is assigned to the corresponding pixel location in the text map, and otherwise a "1" is assigned to that location. Similarly, each pixel of the face map $M_F(j)$ of an area identifies if that pixel displays a part of a person's face in the frame (j) associated with the map. For example, in one implementation, if the pixel is a face pixel, then a "0" is assigned to the corresponding pixel location in the text map, and otherwise a "1" is assigned to that location. It is noted that any appropriate methods can be adopted to determine if a pixel is a text pixel in the case of the text map, and if a pixel is a face pixel in the case of the face map. In regard to the image saliency map $M_S(j)$, each pixel of this map has a value ranging from 0 to 1.0 and indicates the degree to which the pixel attracts the attention of a viewer. For example, in one implementation, a value of zero indicates the highest degree of attraction, while a value of one indicates the least amount of attraction. Here again any appropriate method can be adopted to determine the attractiveness (i.e., saliency) of a pixel in the saliency map. As indicated previously, combining the three maps produces the intrusiveness map $M(j)$ for the area under consideration in the frame being processed. In one implementation, the value of each pixel in the combined intrusiveness map is obtained by multiplying the values of the pixels in the corresponding locations in the text, face and saliency maps. The resulting intrusiveness map has pixels that range in value from zero to one, with zero being indicative of the highest degree of intrusiveness and one the lowest degree of intrusiveness. Note that whenever a pixel depicts text or a face, the combined value of that pixel location is always zero because overlaying text or a face is considered to be highly intrusive to a viewer.

Once an intrusiveness map is computed for each of the prescribed areas in each frame of the set of selected frames of the shot under consideration, it is determined which of the areas would likely be least intrusive to a viewer. In general, this involves determining a combined intensity across the intrusiveness maps computed for the selected set of frames in each of the prescribed areas. In one embodiment, this entails averaging the intensity values of corresponding pixel locations in the intrusiveness maps computed for each frame in the selected set of frames. The averaged intensity maps computed for each of the prescribed areas are then compared and the area associated with the map exhibiting the least overall intensity is selected as the least intrusive area. In one implementation, the average pixel intensity of the pixels in a prescribed area of the averaged intensity maps is computed as the overall intensity of that area. The least intrusive area is then designated as the overlay location in the shot under consideration. This process is then repeated for all the selected shots to produce a designation of the overlay location for each of the selected shots. It is noted that the designated overlay location of a shot includes not only the area, but also the set of consecutive frames of the shot that are to display the overlaid advertisement.

As an example of the foregoing, assume that there are two prescribed areas in the video frames of the shot where an advertisement is permitted to be overlaid—namely the uppermost (U) and bottommost (B) one-fifth of the frames. Accordingly, only these two areas in the selected set of frames will be tested for intrusiveness by computing intrusiveness maps (i.e., $M_U(j)$ and $M_B(j)$) for each area in each of the selected set of frames. The respective maps $M_U(j)$ and $M_B(j)$ of the set of frames are then averaged to produce the averaged intensity maps $M_U(s_i)$ and $M_B(s_i)$, and the one having the least overall intensity (i.e., $\min\{M_U(s_i), M_B(s_i)\}$) is designated as the overlay location of the shot under consideration.

1.2.3 Advertisement-Position Association

At this point the most relevant advertisement has been designated for each of the shots selected for an overlay advertisement. In addition, the least intrusive overlay area has been designated for each of the selected shots. Given this information, the advertisement selected as most relevant to each shot is associated with that shot, and scheduled to be overlaid in the designated least intrusive area whenever the shot is played.

1.2.4 Exemplary Process

The following exemplary process for overlaying video advertisements in a digital video describes one implementation of the procedures disclosed previously. It is noted this exemplary process includes many the features described previously. However, it is understood that one or more of the included features could be eliminated, or others added, in another implementation, without deviating from the general scope of the technique.

Figure 3A:
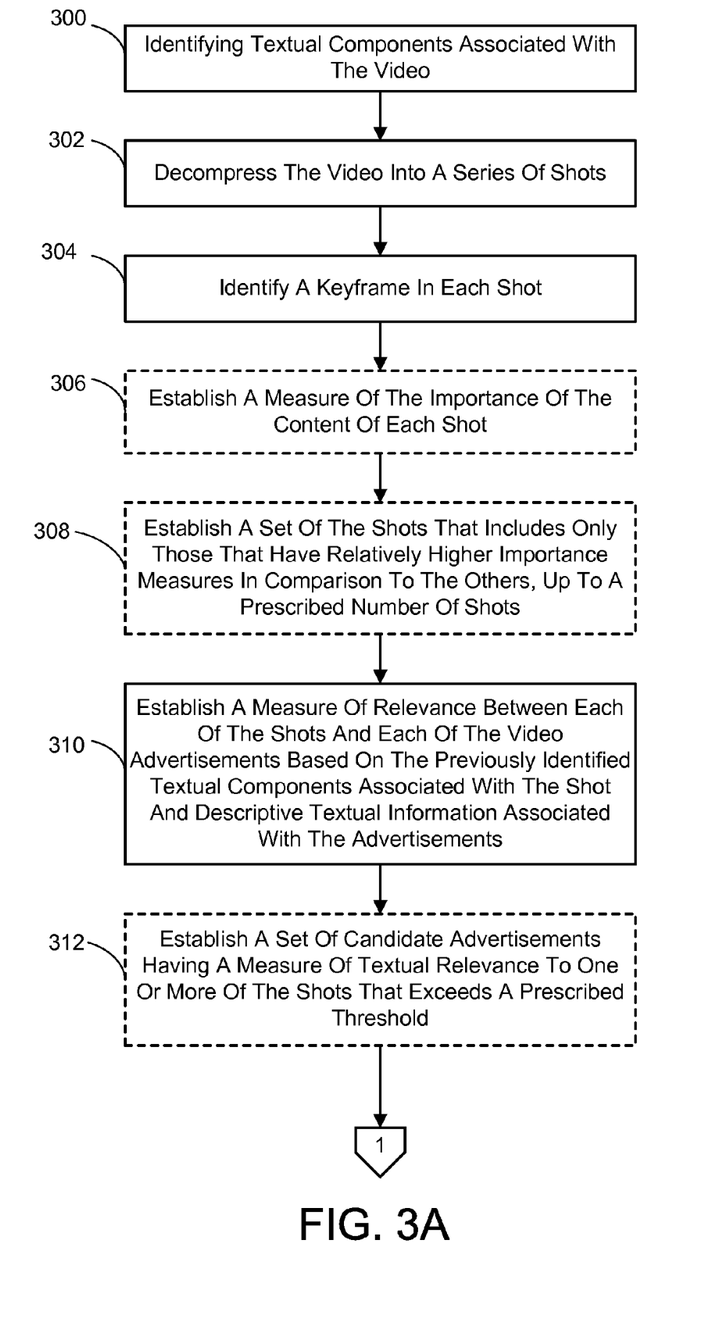
FIGS. 3A-B depict a flow diagram outlining one more detailed embodiment of a process for overlaying video advertisements in a digital video.
Figure 3B:
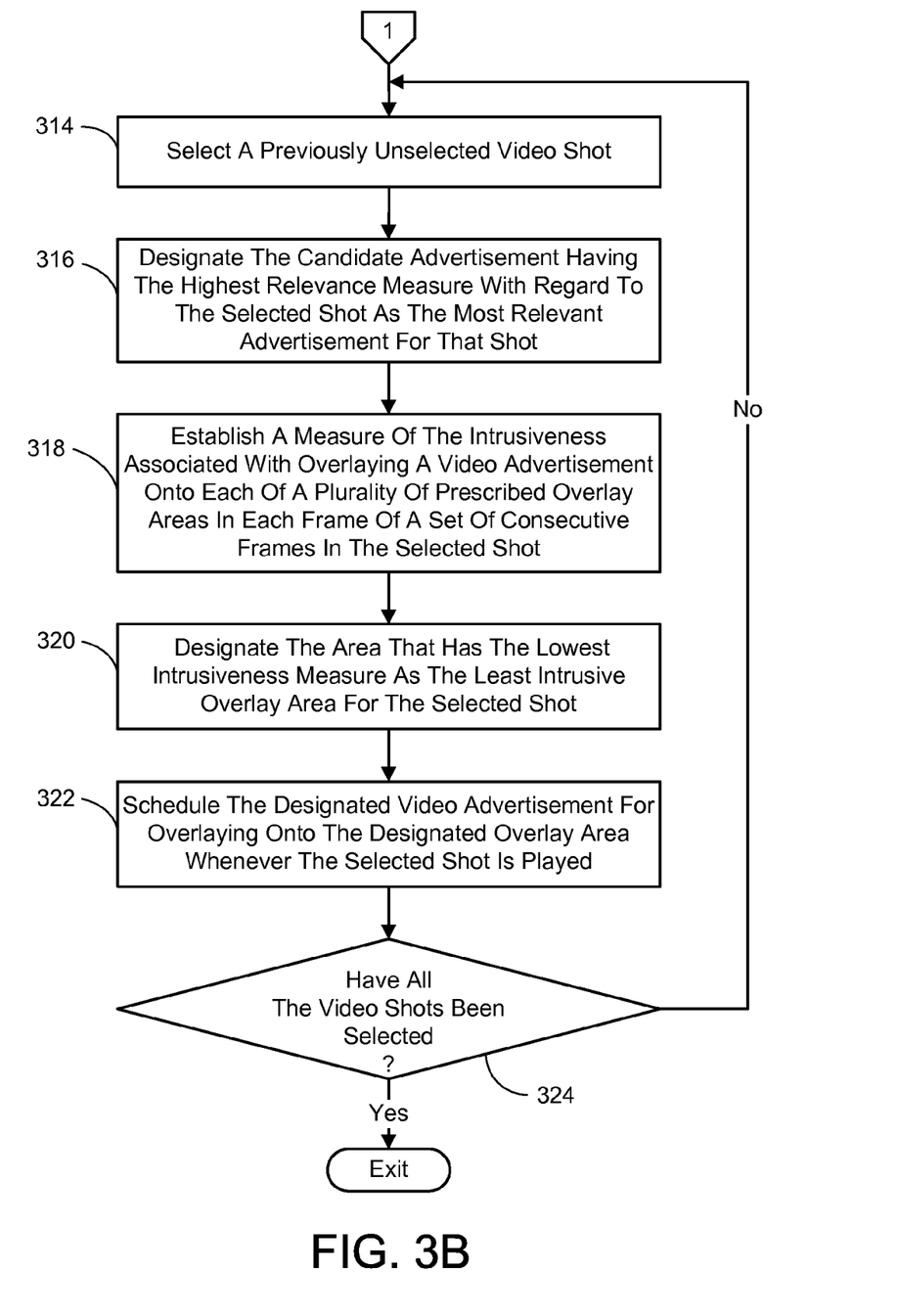

Referring to FIGS. 3A and 3B, the process begins by identifying textual components associated with the video (300). As described previously, this can entail extracting the textual components from the video in the form of one or more of: transcripts of the audio portion of the video; text displayed in frames of the video; and ancillary text such as metadata descriptive of the content of the video. In addition to identifying the textual components, the video is decomposed into a series of shots (302) and a keyframe is identified in each shot (304). It is noted that the video shots and keyframes are taken from a video stream, which is extracted from the video, and which is made up of a sequence of consecutive video frames.

All the video shots can be part of a selectable set of shots. However, as described previously, the set of shots selected for processing can alternatively be reduced to just the most important and interesting (i.e., the highlights of the video) as these shots are the ones the viewer will most likely be paying attention to and so the chances of the viewer's attention being drawn to a overlaid advertisement are increased. To this end, a measure of the importance of the content of each shot can optionally be established (306) as described previously. A set of the shots that includes only those that have relatively higher importance measures in comparison to the others, up to a prescribed number of shots, is then established (308). This prescribed number of shots corresponds to the number of advertisements that are to be overlaid in the video. It is noted that the optional nature of the last two actions (306 and 308) is indicated in FIG. 3A by the use of broken line boxes.

A measure of relevance is established next between each of the shots (which can be the selected set of important shots) and each of the video advertisements that are available for overlaying in the video, based on the previously identified textual components associated with portion of the video corresponding to the shot and descriptive textual information associated with the advertisements (310). The descriptive textual information concerning each of the video advertisements can be input from a video advertisement database as described previously. While all of the video advertisements can be considered in the processing to come, optionally the advertisements considered can be reduced by establishing to a set of candidate advertisements having a measure of textual relevance to one or more of the shots that exceeds a prescribed threshold (312). Here again the optional nature of the last action is indicated in FIG. 3A by the use of broken line box.

As also described previously, the measure of relevance can further include an assessment of the visual similarity between a shot and the video advertisements. While not shown in the exemplary implementation of FIGS. 3A and 3B, this visual similarity feature, if included, involves establishing a measure of visual relevance between each of the shots (which can be the selected set of important shots) and each of the video advertisements (which can be the set of candidate advertisements) based on a degree of visual similarity between the keyframe of a shot and the advertisement under consideration. Then, for each of the video advertisements, the measures of textual relevance and visual relevance computed for a shot are combined to produce an overall relevance measure for each pairing. The manner in which the textual and visual relevance measures are combined was described previously.

Next, a previously unselected video shot is selected (314). If a set of important shots has been established, this action of selecting the video shots is implemented by selecting from that set of the shots. The advertisement having the highest relevance measure with regard to the selected shot is then designated as the most relevant advertisement for that shot (316).

A measure of the intrusiveness associated with overlaying a video advertisement onto each of a plurality of prescribed overlay areas in each frame of a set of consecutive frames in the selected shot is established next (318). This measure of intrusiveness indicates the degree to which overlaying a video advertisement onto an area in the frames of a shot is disruptive to a viewer of the video. In other words, while it is advantageous to overlay a video advertisement in a highlight shot so as to increase the chances that a viewer will see the advertisement, it is also advantageous to place the advertisement in a location that will not block the more salient parts of the shot's content. The particular set of consecutive frames employed from the selected shot and the ways the intrusiveness measure is computed were described previously. Once the measure of intrusiveness has been established for each of the prescribed overlay areas, the area that has the lowest intrusiveness measure is designated as the least intrusive overlay area for the selected shot (320).

Once the most relevant video advertisement and the least intrusive overlay area have been designated for the selected video shot, the designated video advertisement is scheduled for overlaying onto the designated overlay area whenever the shot is played (322). It is then determined if all the video shots in the set of shots being considered have been selected and processed (324). If not, then actions 314 through 324 are repeated. When all the desired shots have been considered, the process ends.

2.0 The Computing Environment

A brief, general description of a suitable computing environment in which portions of the video advertising overlay technique embodiments described herein may be implemented will now be described. The technique embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 4:
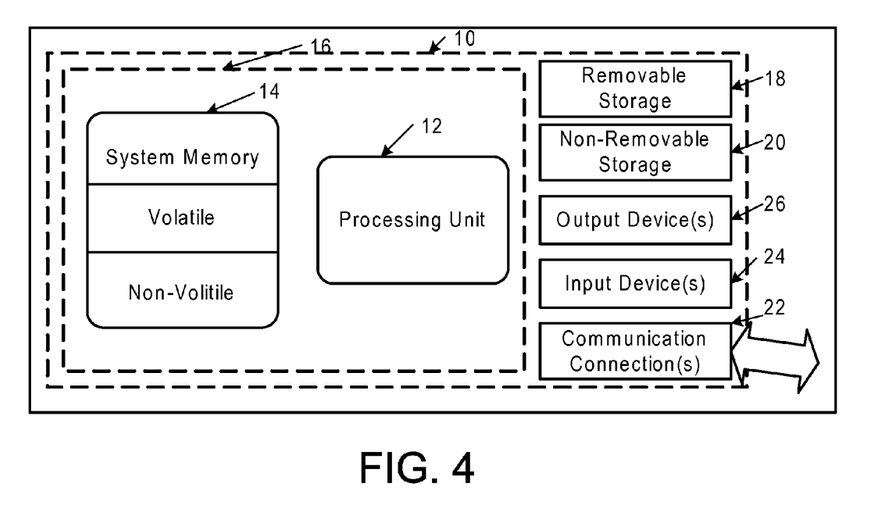
FIG. 4 is a diagram depicting a general purpose computing device constituting an exemplary system for implementing video advertising overlay technique embodiments described herein.

FIG. 4 illustrates an example of a suitable computing system environment. The computing system environment is only one example of a suitable computing environment and is not intended to suggest any limitation as to the scope of use or functionality of video advertising overlay technique embodiments described herein. Neither should the computing environment be interpreted as having any dependency or requirement relating to any one or combination of components illustrated in the exemplary operating environment. With reference to FIG. 4, an exemplary system for implementing the embodiments described herein includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated in FIG. 4 by dashed line 16. Additionally, device 10 may also have additional features/functionality. For example, device 10 may also include additional storage (removable and/or non-removable) including, but not limited to, magnetic or optical disks or tape. Such additional storage is illustrated in FIG. 4 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Device 10 may also have input device(s) 24 such as keyboard, mouse, pen, voice input device, touch input device, camera, etc. Output device(s) 26 such as a display, speakers, printer, etc. may also be included. All these devices are well know in the art and need not be discussed at length here.

The video advertising overlay technique embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

3.0 Other Embodiments

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for overlaying video advertisements in a digital video, comprising:
using a computer to perform the following process actions:
identifying textual components associated with the video;
decomposing the video into a selected set of shots and identifying a keyframe in each shot;
establishing a measure of relevance between each shot and video advertisements that is available for overlaying in the video, based on at least the textual components associated with the shot and descriptive textual information associated with the advertisements;
for each of the selected set of shots,
designating the advertisement having the highest relevance measure as the most relevant advertisement for the shot under consideration;
establishing a measure of the intrusiveness associated with overlaying a video advertisement onto each of a plurality of prescribed overlay areas in each frame of a set of consecutive frames in the shot under consideration, said establishing comprising,
for each of the prescribed overlay areas in each frame of the set of consecutive frames in the shot under consideration,
generating a text map wherein each pixel of the text map identifies if that pixel displays a part of a textual element or not,
generating a face map wherein each pixel of the face map identifies if that pixel displays a part of a person's face or not,
generating an image saliency map wherein each pixel of the image saliency map has a value ranging from 0 to 1.0 and indicates the degree to which the pixel attracts the attention of a viewer with a value of zero indicating the highest degree of attraction and a value of one indicating the least amount of attraction, and
combining the text, face and image saliency maps to produce an intrusiveness map, wherein each pixel of the intrusiveness map has an intensity value directly proportional to a degree of intrusiveness of that pixel, and
for each of the prescribed overlay areas,
determining a combined intensity across the intrusiveness maps computed for the set of consecutive frames in the shot under consideration to produce a combined intrusiveness map,
computing the overall intensity of the combined intrusiveness map, and
designating the overall intensity of the combined intrusiveness map as the intrusiveness measure for the prescribed overlay area under consideration,
designating the prescribed overlay area in the set of consecutive frames that has the lowest established intrusiveness measure as the least intrusive overlay area, and
scheduling the video advertisement designated as the most relevant advertisement for the shot under consideration for overlaying onto the overlay area designated as the least intrusive for the shot, whenever the shot is played.

2. The process of claim 1, wherein the process action of identifying textual components associated with the video, comprises an action of extracting the textual components from the video comprising one or more of:
transcripts of the audio portion of the video;
text displayed in frames of the video; and
ancillary text comprising metadata descriptive of the content of the video.

3. The process of claim 1, wherein the process action of decomposing the video into a series of shots, comprises actions of:
extracting a video stream from the video comprising a sequence of consecutive video frames; and
decomposing the video stream into the series of shots, wherein each shot comprises a set of consecutive video frames formed from a sub-sequence of the video stream.

4. The process of claim 1, wherein the process action of decomposing the video into a selected set of shots comprises the process actions of:
establishing a measure of the importance of the content of each shot capable of being extracted from the video; and
selecting a set of the shots having as elements only those shots that have relatively higher importance measures in comparison to the other non-selected shots, up to a prescribed number of shots.

5. The process of claim 4, wherein the prescribed number of shots corresponds to the number of video advertisements that are to be overlaid in the video.

6. The process of claim 4, wherein the process action of establishing a measure of the importance, comprises the action of, for each shot capable of being extracted from the video, computing the product of the duration of the shot and a motion intensity of the shot.

7. The process of claim 6, wherein the motion intensity of a shot is defined as the average difference in intensity between each consecutive frame in the shot.

8. The process of claim 4, wherein the process action of establishing the measure of relevance between each shot and video advertisements, further comprises the actions of:
establishing a set of candidate video advertisements whose measure of textual relevance exceeds a prescribed threshold;
establishing a measure of visual relevance between each of the selected set of shots and each of the set of candidate video advertisements based on a degree of visual similarity between the keyframe of the shot and the candidate advertisement under consideration; and
combining the measure of textual relevance and the measure of the visual relevance between each of the selected set of shots and each of the set of candidate advertisements to produce said relevance measure for each pairing.

9. The process of claim 8, wherein the process action of combining the measure of textual relevance and the measure of the visual relevance between a selected shot under consideration and each of the set of candidate advertisements, comprises an action of computing a weighted combination thereof wherein a first weight factor is applied to the measure of textual relevance and the result is added to the result of applying a second weight factor to the measure of the visual relevance.

10. The process of claim 9, wherein the first weight factor is 0.2 and the second weight factor is 0.8.

11. The process of claim 1, wherein each pixel in the text map depicting a part of a textual element is assigned a zero value and all the other pixels are assigned a value of one, and wherein each pixel in the face map depicting a part of a person's face is assigned a zero value and all the other pixels are assigned a value of one, and wherein the process action of combining the text, face and image saliency maps to produce an intrusiveness map, comprises an action of, for each corresponding pixel location, computing the product of the values of the pixels from the text, face and saliency maps, such that the resulting intrusiveness map has pixels values that range from zero to one, with zero being indicative of the highest degree of intrusiveness and one being indicative of the lowest degree of intrusiveness.

12. The process of claim 1, wherein the process action of determining the combined intensity across the intrusiveness maps computed for the set of consecutive frames in the shot under consideration in the prescribed overlay area under consideration, comprises an action of averaging the intensity values of corresponding pixel locations in the intrusiveness maps.

13. The process of claim 1, wherein the process action of computing the overall intensity of the combined intrusiveness map, comprises an action of computing the average pixel intensity of the pixels in the combined intrusiveness map.

14. A computer-implemented process for overlaying video advertisements in a digital video, comprising:
using a computer to perform the following process actions:
extracting a video stream from the video comprising a sequence of consecutive video frames;
extracting textual components associated with the video comprising at least one of,
  transcripts of the audio portion of the video, or
  text displayed in frames of the video, or
  ancillary text comprising metadata descriptive of the content of the video;
decomposing the video stream into video shots and identifying a keyframe in each shot;
establishing a measure of the importance of the content of each shot; and
selecting a set of the shots having as elements only those shots that have relatively higher importance measures in comparison to the other non-selected shots, up to a prescribed number of shots;
inputting descriptive textual information about each video advertisement;
establishing a measure of textual relevance between the selected set of shots and the video advertisements based on the textual components associated with the shots and the descriptive textual information associated with the advertisements,
establishing a set of candidate video advertisements whose measure of textual relevance exceeds a prescribed threshold;
establishing a measure of visual relevance between each of the selected set of shots and each of the set of candidate video advertisements based on a degree of visual similarity between the keyframe of the shot and the candidate advertisement under consideration; and
combining the measure of textual relevance and the measure of the visual relevance between each of the selected set of shots and each of the set of candidate advertisements to produce an overall relevance measure for each pairing;
for each of the selected set of shots,
  designating the candidate advertisement having the highest overall relevance measure with regard to the shot under consideration as the most relevant advertisement for that shot,
  establishing a measure of the intrusiveness associated with overlaying a video advertisement onto each of a plurality of prescribed overlay areas in each frame of a set of consecutive frames in the shot under consideration, wherein the measure of intrusiveness indicates the degree to which overlaying a video advertisement onto an area in the frames of a shot is disruptive to a viewer of the video, said establishing comprising,
    for each of the prescribed overlay areas in each frame of the set of consecutive frames in the shot under consideration,
      generating a text map wherein each pixel of the text map identifies if that pixel displays a part of a textual element or not,
      generating a face map wherein each pixel of the face map identifies if that pixel displays a part of a person's face or not,
      generating an image saliency map wherein each pixel of the image saliency map has a value ranging from 0 to 1.0 and indicates the degree to which the pixel attracts the attention of a viewer with a value of zero indicating the highest degree of attraction and a value of one indicating the least amount of attraction, and
      combining the text, face and image saliency maps to produce an intrusiveness map, wherein each pixel of the intrusiveness map has an intensity value directly proportional to a degree of intrusiveness of that pixel, and
    for each of the prescribed overlay areas,
      determining a combined intensity across the intrusiveness maps computed for the set of consecutive frames in the shot under consideration to produce a combined intrusiveness map,
      computing the overall intensity of the combined intrusiveness map, and
      designating the overall intensity of the combined intrusiveness map as the intrusiveness measure for the prescribed overlay area under consideration,
  designating the prescribed overlay area in the set of consecutive frames that has the lowest established intrusiveness measure as the least intrusive overlay area, and
  scheduling the video advertisement designated as the most relevant advertisement for the shot under consideration to be overlaid onto the overlay area designated as the least intrusive for the shot, whenever the shot is played.

* * * * *